(12) United States Patent
Saito (10) Patent No.: US 9,624,916 B2
(45) Date of Patent: Apr. 18, 2017

(54) HIGH-PRESSURE FUEL SUPPLY PUMP (75) Inventor: Atsuji Saito, Hitachinaka (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 1 day.

(21) Appl. No.: 14/238,685

(22) PCT Filed: Aug. 7, 2012

(86) PCT No.: PCT/JP2012/070083
§ 371 (c)(1),
(2), (4) Date: Feb. 12, 2014

(87) PCT Pub. No.: WO2013/042472
PCT Pub. Date: Mar. 28, 2013

(65) Prior Publication Data
US 2014/0193280 A1  Jul. 10, 2014

(30) Foreign Application Priority Data
Sep. 20, 2011 (JP) ................. 2011-204041

(51) Int. Cl.
*F04B 11/00* (2006.01)
*F02M 55/04* (2006.01)
(Continued)

(52) U.S. Cl.
CPC .............. *F04B 11/00* (2013.01); *B23K 26/20* (2013.01); *F02M 21/0245* (2013.01); *F02M 55/04* (2013.01); *F02M 59/44* (2013.01)

(58) Field of Classification Search
CPC ... F04B 11/0008; F04B 11/00; F04B 11/0016; B23K 1/005; B23K 1/0056; B23K 26/20;
(Continued)

(56) References Cited

U.S. PATENT DOCUMENTS 5,845,621 A * 12/1998 Robinson et al. ............ 123/456
7,124,738 B2    10/2006 Usui et al.
(Continued)

FOREIGN PATENT DOCUMENTS

DE     10 2004 002 489 A1    8/2005
JP         56-62691            5/1981
(Continued)

*Primary Examiner* — Charles Freay
*Assistant Examiner* — Philip Stimpert
(74) *Attorney, Agent, or Firm* — Volpe and Koenig, P.C.

(57) ABSTRACT

The damper mechanism used for a high-pressure fuel supply pump system is configured so that an outer circumferential surface of a cover in regard to the thickness direction of the base material of the cover engages with the inner circumference of an open end part of a bottomed tubular concave part formed in a damper housing or in a pump housing of the high-pressure fuel supply pump. The total height of the damper as a low-pressure pulsation reducing mechanism can be reduced and the dimensions of the damper in the radial directions can also be reduced. In cases where the damper mechanism is formed integrally with the high-pressure fuel supply pump, the total height of the high-pressure fuel supply pump can be reduced and the dimensions of the damper part in the radial directions can also be reduced.

17 Claims, 9 Drawing Sheets

(51) Int. Cl.
*F02M 59/44* (2006.01)
*B23K 26/20* (2014.01)
*F02M 21/02* (2006.01)

(58) Field of Classification Search
CPC .... F02M 21/0245; F02M 55/04; F02M 59/44; F02M 37/0041; F02M 2200/31; F02M 2200/315
USPC .......................................................... 417/540
See application file for complete search history.

(56) References Cited

U.S. PATENT DOCUMENTS

| 8,430,655 | B2 | 4/2013 | Kobayashi et al. | |
| 2007/0079810 | A1* | 4/2007 | Usui et al. | 123/467 |
| 2008/0289713 | A1* | 11/2008 | Munakata et al. | 138/26 |
| 2011/0110807 | A1 | 5/2011 | Kobayashi et al. | |

FOREIGN PATENT DOCUMENTS

| JP | 11-280904 | | 10/1999 |
| JP | 2004-138071 | A | 5/2004 |
| JP | 2005-042554 | A | 2/2005 |
| JP | 2008-014319 | A | 1/2008 |
| JP | 2008-286144 | A | 11/2008 |
| JP | 2010-007693 | A | 1/2010 |
| JP | 2010-106740 | A | 5/2010 |
| JP | 2010-174903 | | 8/2010 |
| JP | 2010174903 | A * | 8/2010 |
| JP | 2010-216466 | A | 9/2010 |
| JP | 2011-106470 | | 6/2011 |
| JP | 2011-106470 | A | 6/2011 |
| JP | 2013-064364 | A | 4/2013 |
| WO | 2010/106645 | | 9/2010 |

* cited by examiner

HIGH-PRESSURE FUEL SUPPLY PUMP

TECHNICAL FIELD

The present invention relates to a high-pressure fuel supply device for an internal combustion engine of the cylinder direct fuel injection type, and in particular, to a damper mechanism as a low-pressure pulsation reducing mechanism which is attached to a low-pressure fuel path and a high-pressure fuel supply pump which is integrally equipped with the damper mechanism.

BACKGROUND ART

JP-2010-106740-A describes a high-pressure fuel supply pump in which a low-pressure fuel chamber in the upper part of the pump is equipped with a damper as a low-pressure pulsation reducing mechanism. A cup-shaped cover is mounted on the top of the damper and is joined to the pump housing.

Patent Literature 1: JP-2010-106740-A

SUMMARY OF THE INVENTION

Problem to be Solved by the Invention

In the above conventional technology, however, the cover is in a cup shape and thus the total height of the damper mechanism as the low-pressure pulsation reducing mechanism is necessitated to be increased by the thickness of the base material forming the cover. The external diameter of the damper mechanism is also necessitated to be large.

This leads to a problem in that the total height of the high-pressure fuel supply pump becomes high and the external diameter of the pump also becomes large in cases where the damper mechanism is integrally attached to the high-pressure fuel supply pump.

It is therefore the primary object of the present invention to reduce the body size of the damper mechanism as the low-pressure pulsation reducing mechanism and to reduce the total height of the high-pressure fuel supply pump in cases where the damper mechanism as the low-pressure pulsation reducing mechanism is integrally attached to the high-pressure fuel supply pump.

Means for Solving the Problem

A tubular part for engaging with the outer edge of a cover is formed on the inner circumference of an open end part of a low-pressure fuel chamber formed in a damper housing or in a pump housing of the high-pressure fuel supply pump so that an outer circumferential surface of the cover in regard to the thickness direction of the base material of the cover engages with the tubular part.

Effect of the Invention

According to the present invention configured as above, the total height of the damper as the low-pressure pulsation reducing mechanism can be reduced, dimensions of the damper in the radial directions can also be reduced, and a low-pressure pulsation reducing mechanism (damper mechanism) in a small size can be provided.

Further, in cases where the low-pressure pulsation reducing mechanism (damper mechanism) is formed integrally with a high-pressure fuel supply pump, the total height of the high-pressure fuel supply pump can be reduced, dimensions of the damper part in the radial directions can also be reduced, and a high-pressure fuel supply pump in a small body size can be provided.

DESCRIPTION OF REFERENCE CHARACTERS

1 Pump housing
2 Plunger
8 Discharge valve mechanism
9 Low-pressure pulsation reducing mechanism
11 Pressurizing chamber
14 Damper cover
24 Injector
30 Electromagnetic inlet valve
90 Metallic damper
91 Damper holder
101 Intake joint

MODE FOR CARRYING OUT THE INVENTION

In the following, the present invention will be described in detail based on embodiments illustrated in the drawings.

Embodiments

A first embodiment of the present invention will be described below with reference to FIGS. 1-4.

Figure 4:
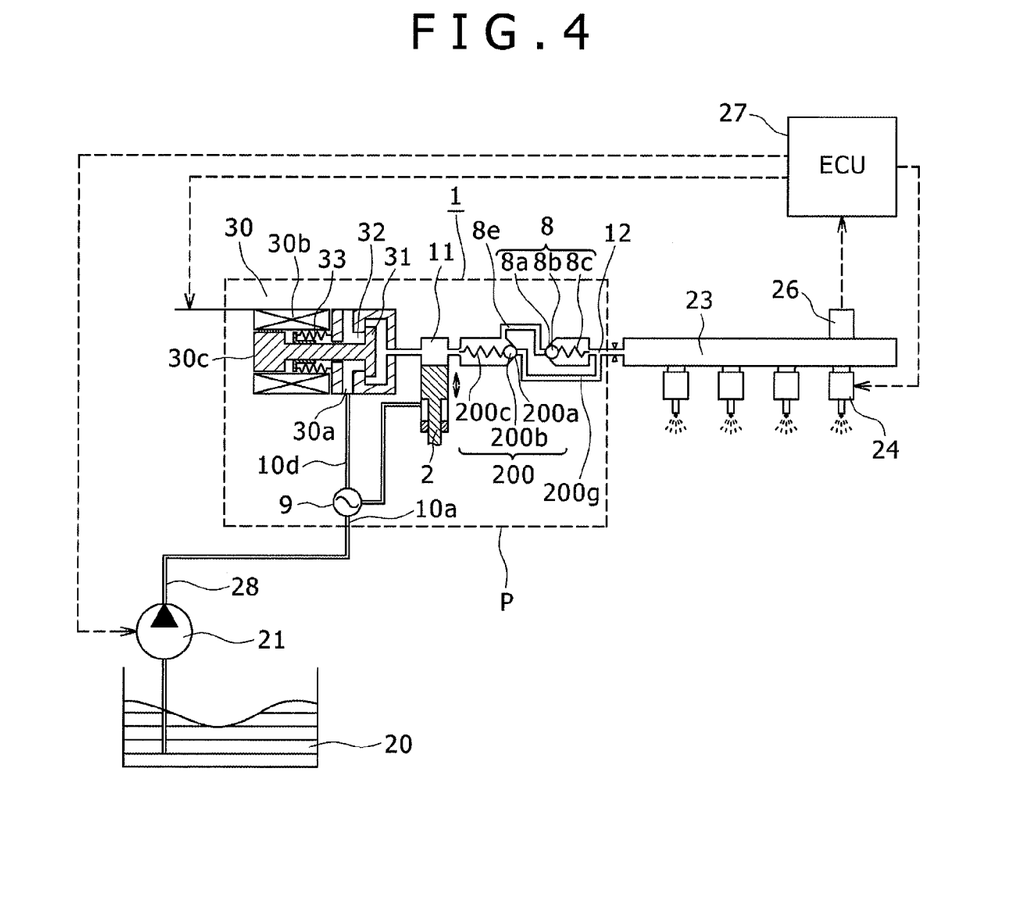
FIG. 4 is a schematic block diagram showing an example of a fuel supply system employing the high-pressure fuel supply pump in accordance with the first embodiment practicing the present invention.

First, the configuration and operation of the system will be explained below referring to FIG. 4 showing the overall configuration of the system.

In FIG. 4, the part surrounded by the broken line P represents the main body of the high-pressure pump. The broken line P indicates that the mechanisms and components illustrated inside the broken line P are integrally installed in a high-pressure pump housing 1.

The fuel in a fuel tank 20 is pumped up by a feed pump 21 and fed to an intake joint 10a of the pump housing 1 through an intake pipe 28.

The fuel flowing through the intake joint 10a reaches an intake port 30a of an electromagnetic inlet valve 30 (constituting a flow rate control mechanism) via a low-pressure pulsation reducing mechanism 9 (referred to also as a "damper" or a "damper mechanism") and an intake path 10d. Details of the low-pressure pulsation reducing mechanism 9 will be explained later.

The electromagnetic inlet valve 30 includes an electromagnetic coil 30b. In a state in which the electromagnetic coil 30b is energized, an anchor 30d of an electromagnetic plunger 30c is attracted to a core 34 and moves leftward in FIG. 1, by which a spring 33 is maintained in a compressed state. At this time, an inlet valve element 31 attached to the tip end of the electromagnetic plunger 30c is in a state of opening an intake 32 which leads to a pressurizing chamber 11 of the high-pressure pump.

Figure 1:
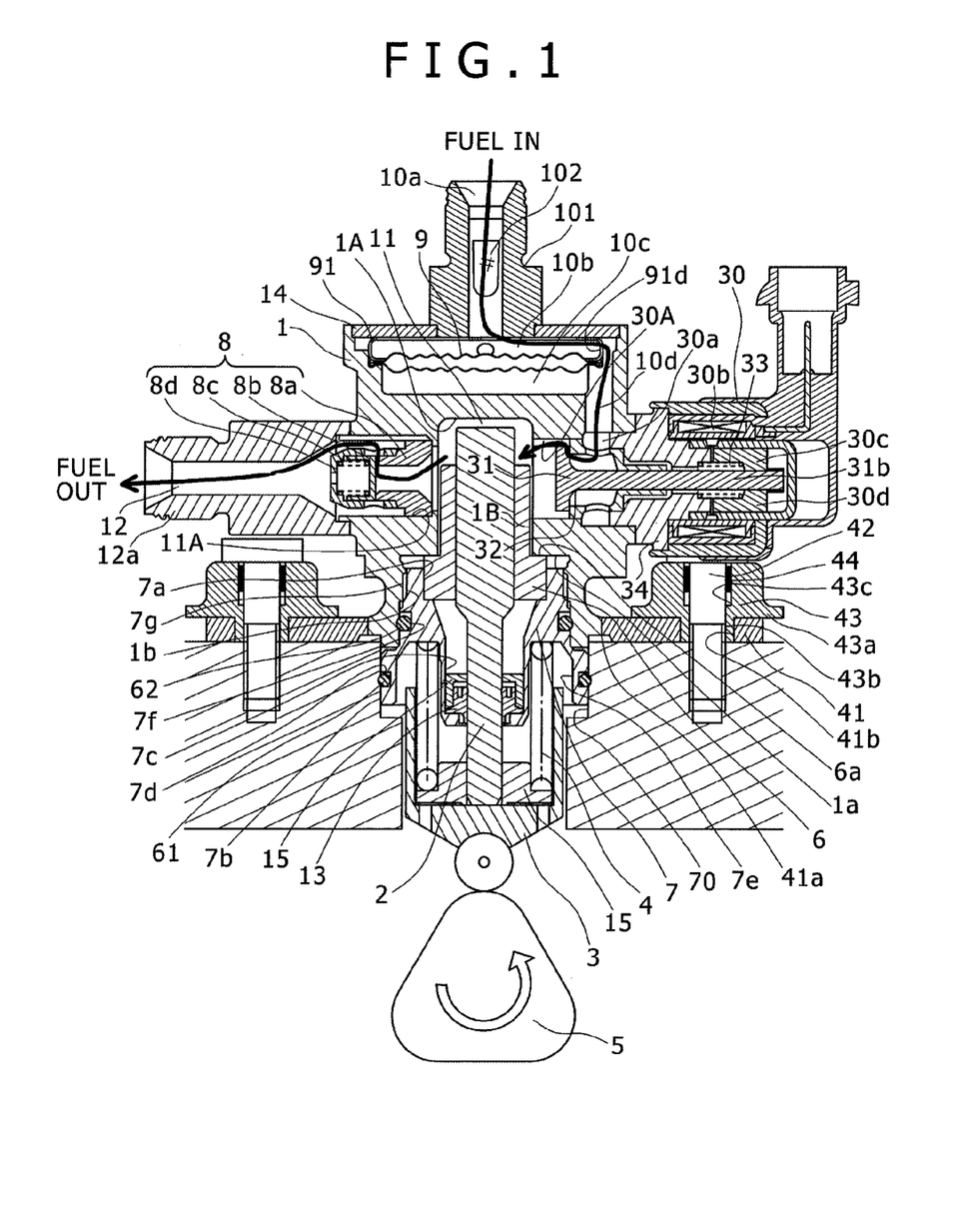
FIG. 1 is an overall vertical sectional view of a high-pressure fuel supply pump in accordance with a first embodiment practicing the present invention.

In a state in which the electromagnetic coil 30b is not energized and there is no fluid differential pressure between the intake path 10d (intake port 30a) and the pressurizing chamber 11, the inlet valve element 31 is biased in the valve-closing direction by the biasing force of the spring 31 and the intake 32 remains in the closed state. As above, the electromagnetic inlet valve. 30 is configured as an electromagnetic valve of the so-called "normally closed type".

Specifically, the system operates as described below.

In an intake process in which a plunger 2 shifts downward in FIG. 1 due to the rotation of a cam which will be explained later, the capacity of the pressurizing chamber 11 increases and the fuel pressure inside the pressurizing chamber 11 drops. When the fuel pressure inside the pressurizing chamber 11 falls below the pressure in the intake path 10d (intake port 30a) in this process valve-opening force due to the fluid differential pressure of the fuel (force shifting the inlet valve element 31' leftward in FIG. 1) occurs to the inlet valve element 31.

The electromagnetic inlet valve 30 has been set so that the inlet valve element 31 overcomes the biasing force of the spring 33 and opens the valve (intake 32) due to the valve-opening force caused by the fluid differential pressure.

Whet a control signal from an engine control unit 27 (hereinafter referred to as an "ECU 27") is applied to the electromagnetic inlet valve 30 in this state, electric current flows through the electromagnetic coil 30b of the electromagnetic inlet valve 30, the electromagnetic plunger 30c is biased leftward in FIG. 1 by the electromagnetic biasing force occurring between the anchor 30d and the core 34, and the electromagnetic plunger 30c moves leftward in FIG. 1 (when the inlet valve element 31 is not totally open) until the inlet valve element 31 is totally open. When the inlet valve element 31 is totally open due to the fluid differential pressure, the inlet valve element 31 is maintained at that position. Consequently, the spring 33 is maintained in the compressed state and the intake 32 is maintained in the opened state by the inlet valve element 31.

When the plunger 2 finishes the intake process and shifts to the pressurizing process (in which the plunger 2 moves upward in FIG. 1) while the application of the input voltage to the electromagnetic inlet valve 30 is maintained, the magnetic biasing force is still maintained since the energization of the electromagnetic coil 30b is maintained. Thus, the inlet valve element 31 still keeps on opening the valve (intake 32).

While the capacity of the pressurizing chamber 11 decreases along with the pressurizing movement of the plunger 2, the pressure in the pressurizing chamber does not rise in this state since the fuel once taken into the pressurizing chamber 11 is returned to the intake path 10d (intake port 30a) through the inlet valve element 31 in the valve-opening state. This process will hereinafter be referred to as a "returning process".

In this state, if the energization of the intake port 30a is stopped by canceling the control signal from the ECU 27, the magnetic biasing force acting on the electromagnetic plunger 30c ceases after a certain time period (magnetic/mechanical delay time). With the extinction of the electromagnetic force acting on the anchor 30d of the electromagnetic plunger 30c, the inlet valve element 31 being biased by the biasing force of the spring 33 closes the intake 32. From the moment of closing the intake 32, the fuel pressure in the pressurizing chamber 11 rises along with the upward movement of the plunger 2. Thereafter, when the fuel pressure in the pressurizing chamber 11 reaches the pressure in a fuel discharge port 12, a discharge valve 8b of a discharge valve mechanism 8 opens. Accordingly, the fuel remaining in the pressurizing chamber 11 is discharged to the inside of the fuel discharge port 12 and is supplied to a common rail 23. This process will hereinafter be referred to as a "discharging process". Thus, the pressurizing process of the plunger 2 (rising process from the bottom dead center to the top dead center) is made up of the returning process and the discharging process.

By controlling the timing of canceling the energization of the electromagnetic coil 30b of the electromagnetic inlet valve 30 as above, the amount of the discharged high-pressure fuel can be controlled. By making the energization cancellation timing of the electromagnetic coil 30b earlier, the ratios of the returning process and the discharging process in the pressurizing process are decreased and increased, respectively. In other words, the amount of the fuel returned to the intake path 10d (intake port 30a) decreases and the amount of the fuel discharged at the high pressure increases. In contrast, by delaying the timing of canceling the input voltage, the ratios of the returning process and the discharging process in the pressurizing process are increased and decreased, respectively. In other words, the amount of the fuel returned to the intake path 10d increases and the amount of the fuel discharged at the high pressure decreases. The timing of canceling the energization of the electromagnetic coil 30b is controlled by a command from the ECU.

With the above configuration, the amount of the fuel discharged at the high pressure can be adjusted to the amount required by the internal combustion engine by controlling the timing of canceling the energization of the electromagnetic coil 30b.

The discharge valve mechanism 8 is arranged at the outlet of the pressurizing chamber 11. The discharge valve mechanism 8 includes a discharge valve sheet 8a, the discharge valve 8b, and a discharge valve spring 8c. When there is no fluid differential pressure between the pressurizing chamber 11 and the fuel discharge port 12, the discharge valve 8b is pressed against the discharge valve sheet 8a by the biasing force of the discharge valve spring 8c (closed state). Only when the fuel pressure in the pressurizing chamber 11 exceeds the fuel pressure in the fuel discharge port 12, the discharge valve 8b opens against the biasing force of the discharge valve spring 8c, by which the fuel in the pressurizing chamber 11 is discharged at the high pressure to the common rail 23 via the fuel discharge port 12.

As above, from the fuel which has been led to the fuel intake 10a, a necessary amount of fuel is pressurized into the high pressure in the pressurizing chamber 11 of the pump housing 1 by the reciprocating motion of the plunger 2, and the pressurized fuel is pressure-fed from the fuel discharge port 12 to the common rail 23.

The common rail 23 is equipped with injectors 24 and a pressure sensor 26. A plurality of injectors 24 are provided corresponding to the number of cylinders of the internal combustion engine. The injectors 24 open and close their valves according to control signals from the ECU 27 and thereby inject the fuel into the cylinders.

The configuration and operation of the low-pressure pulsation reducing mechanism (damper mechanism) formed in the high-pressure fuel pump will be explained in detail below referring to FIGS. 1-4.

As mentioned above, the pump body contains the pressurizing chamber 11 formed at the center, the electromagnetic inlet valve 30 for supplying the fuel to the pressurizing chamber 11, and the discharge valve mechanism 8 for discharging the fuel from the pressurizing chamber 11 to the discharge path. Further, a cylinder 6 for guiding the reciprocating motion of the plunger 2 is arranged to extend to the pressurizing chamber 11.

The cylinder 6 is held by a cylinder holder 7 from outside. The cylinder 6 is fixed to the pump housing 1 by screwing male screws arranged on the outer circumference of the cylinder holder 7 into female screws threaded on the pump housing 1. The cylinder 6 holds the plunger 2 reciprocating in the pressurizing chamber so that the plunger 2 can smoothly slide in the direction of the reciprocating motion.

Provided at the lower end of the plunger 2 is a tappet 3 which converts the rotary motion of a cam 5 (attached to a cam shaft of the engine) into an up-and-down motion and transmits the up-and-down motion to the plunger 2. The plunger 2 is fixed to the tappet 3 by use of biasing force of a spring 4 attached to the plunger 2 via a retainer 15. With this configuration, the plunger 2 can be reciprocated up and down according to the rotary motion of the cam 5.

Further, a plunger seal 13 (which is held by the lower end part of the inner circumference of the cylinder holder 7) is arranged to slidably contact the outer circumferential surface of the plunger 2 in a lower end part of the cylinder 6 shown in FIG. 1. With this configuration, the blowby gap between the plunger 2 and the cylinder 6 is sealed up and the leak of the fuel to the outside is prevented. At the same time, the lubricant (including the engine oil) for the lubrication of the sliding parts inside the engine room is prevented from flowing into the inside of the pump housing 1 via the blowby gap.

In the pump body (pump housing), a bottomed (110) tubular concave part 111 is formed in a part of an intake path 10c. The bottomed (110) tubular concave part 111 serves also as a damper storage room. At the open end 111A of the bottomed (110) tubular concave part 111, the outer circumferential surface 14S of a tabular damper cover 14 is engaged with the inner circumferential surface of the bottomed (110) tubular concave part 111. The low-pressure pulsation reducing mechanism 9 (damper mechanism) for reducing the propagation of the pressure pulsation on the low pressure side (occurring in the pump) into the fuel pipe 28 is arranged inside the bottomed (110) tubular concave part ill isolated by the tabular damper cover 14. The damper storage room is formed between the bottomed (110) tubular concave part 111 formed on the outer circumference of the pump body and the tabular damper cover 14 closing the open end 111A of the bottomed (110) tubular concave part 111.

In the case where the fuel once taken into the pressurizing chamber 11 is returned to the intake path 10d (intake port 30a) through the inlet valve element 31 in the valve-opening state due to the flow rate control state, the pressure pulsation occurs in the intake path 10 due to the fuel returned to the intake path 10d (intake port 30a). However, since a metallic damper 90 formed by welding two disk-shaped metallic diaphragms 90a and 90b (having corrugated plate-like cross-sectional shapes) together at their outer circumferences (90w) and injecting inert gas (e.g., argon) into the inside of the diaphragms 90a and 90b is attached to the intake path 10c (the damper storage room arranged in the intake path 10), the pressure pulsation is absorbed and reduced by the expansion and contraction of the metallic damper 90.

The peripheral structure of the damper cover 14 will be explained in detail below.

The damper cover 14 is in a tabular shape as shown in FIG. 1. An intake joint 101 forming an intake port 10a is joined to the top of the damper cover 14.

The damper cover 14 is joined to the pump housing 1 while compressing a damper holder 91 which is used as an elastic body.

Figure 2:
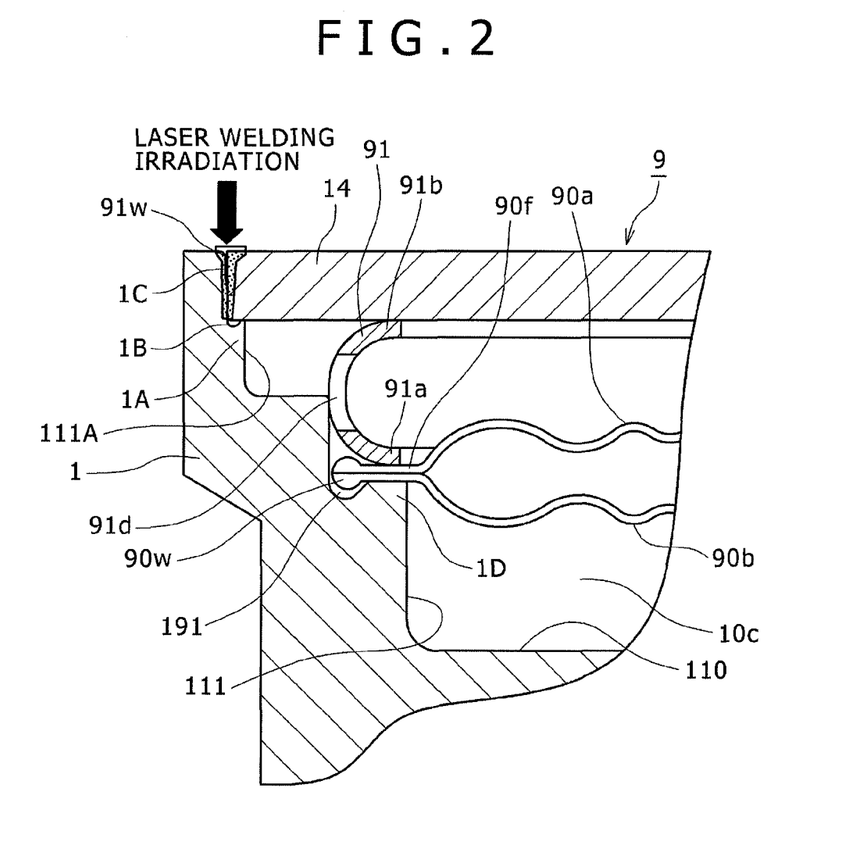
FIG. 2 is a partial enlarged view for explaining the configuration around a cover in the first embodiment practicing the present invention.

As shown in FIG. 2, the damper holder 91 fixes and holds the metallic damper 90 on the pump housing by storing the load like a spring and pressing the metallic damper 90 against a step part 1D of the tubular concave part of the pump housing. Specifically, a lower edge part 91a of the doughnut-shaped damper holder 91 is brought into contact with a brim part 90f formed on the outer circumference of the metallic damper 90. Then, the lower surface of the damper cover 14 is brought into contact with an upper edge part 91b of the damper holder 91 and the damper cover 14 is pressed toward the step part 1D.

At the corner part of the step part 1D, an annular groove 191 is formed in a depth suitable for accommodating the welding part 90w of the metallic damper 90. Therefore, no force acts on the outer circumferential welding part 90w of the metallic damper 90 even when the brim part 90f of the metallic damper 90 is pressed down by the lower edge part 91a of the damper holder 91.

The low-pressure fuel flowing in through the intake port 10a is filtered by a filter 102, by which foreign substances of a prescribed size or larger are removed. Then, the low-pressure fuel flows into the intake path 10d through a fuel path 91d around the damper holder 91. Thus, the pressure of the low-pressure fuel evenly acts on both sides (upper and lower surfaces) of the metallic damper 90.

Figure 3:
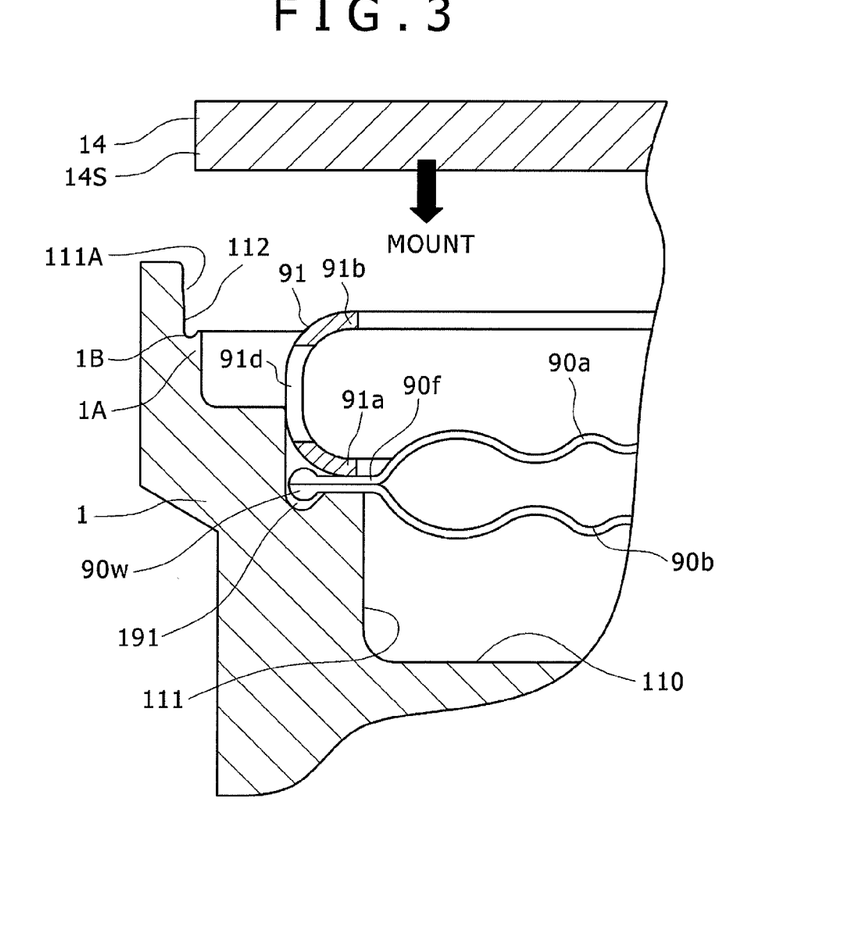
FIG. 3 is a schematic diagram for explaining an assembly process in the first embodiment practicing the present invention.

FIG. 2 is a partial enlarged view for explaining the damper cover 14 (see FIG. 1) in this embodiment in detail. FIG. 3 shows a state before the damper cover 14 is joined to the pump housing 1.

In the pump body (pump housing), the tubular concave part 111 having the bottom 110 is formed in a part of the intake path 10c. The tubular concave part 111 serves also as the damper storage room. The outer circumferential surface 14p of the tabular damper cover 14 is engaged with the inner circumferential surface of the open end 111A of the tubular concave part 111 having the bottom 110. The metallic damper 90 is stored in the tubular concave part 111 isolated by the tabular damper cover 14.

In a state in which the damper cover 14 is pressing down the damper holder 91 and the lower surface of the damper cover 14 is in contact with the upper surface of a stepped part 1A of the pump housing 1, the damper cover 14 and the pump housing 1 are welded and joined together by applying a laser beam to the interface (engagement part) between the inner circumferential surface of the pump housing 1 and the outer circumferential surface 14S of the damper cover 14. In the depth direction of the engagement surface forming the interface, a narrow annular gap 1C has been formed from the top to an intermediate depth. The annular gap 1C is employed in order to allow the laser beam to reach the bottom of the engagement part. The annular gap 1C is formed by making the diameter of the inner circumferential surface 112 of the open end 111A of the tubular concave part 111 slightly larger than the inner diameter of a deeper part of the tubular concave part 111. The annular gap 1C on the open-end side, between the outer circumferential surface 14S of the damper cover 14 and the inner circumferential surface 112 of the tubular concave part 111, can also be formed by setting the diameter of the outer circumferential surface 14S of the damper cover 14 to be smaller at the open end 111A of the tubular concave part 111.

The laser beam is applied to the annular gap 1C from above in the direction indicated by the arrow. The laser equipment needs only a small installation space since the welding can be carried out by moving the laser equipment above the damper cover 14 for one cycle along the annular gap 1C of the engagement part.

An annular groove 1B for letting out the welding spatters is formed on the upper surface of the stepped part 1A of the pump housing 1 along the whole inner circumference of the pump housing 1. The metallic material melted by the laser beam is captured by the annular groove 1B, without flying into the intake path 10d which is formed as a part of the low-pressure fuel path.

Figure 5:
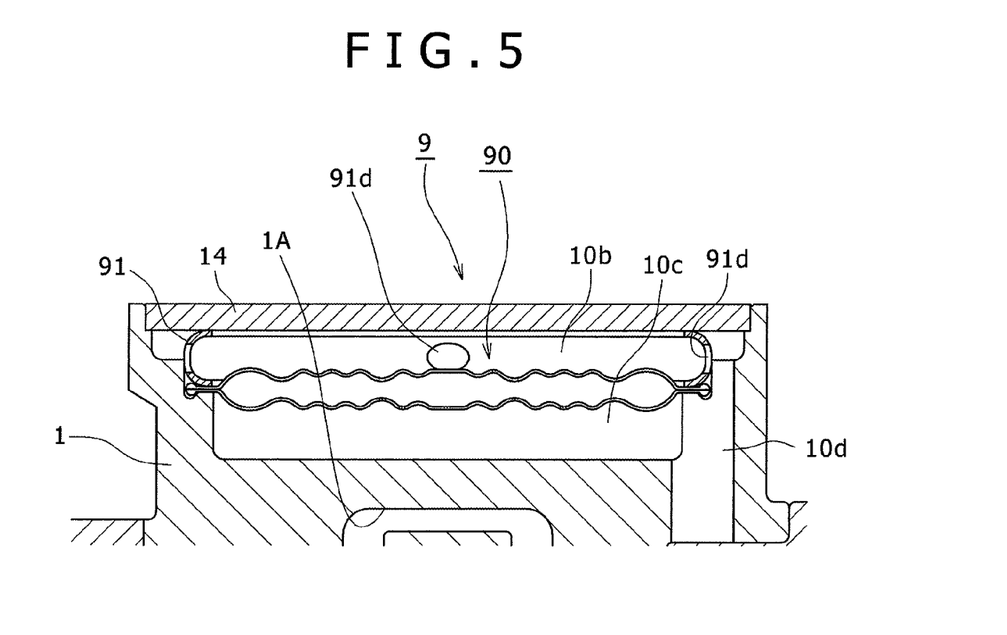
FIG. 5 is an overall vertical sectional view of a high-pressure fuel supply pump in accordance with a second embodiment practicing the present invention.

FIG. 5 is an overall vertical sectional view of a high-pressure fuel supply pump in accordance with a second embodiment practicing the present invention. The intake joint 101 is arranged at a different position in the pump housing and is connected to the intake path 10c by using a low-pressure fuel path. With this configuration, the damper cover 14 can be formed in a simple shape totally made up of a flat plate alone. With the simplified configuration, the workability is improved.

Figure 6:
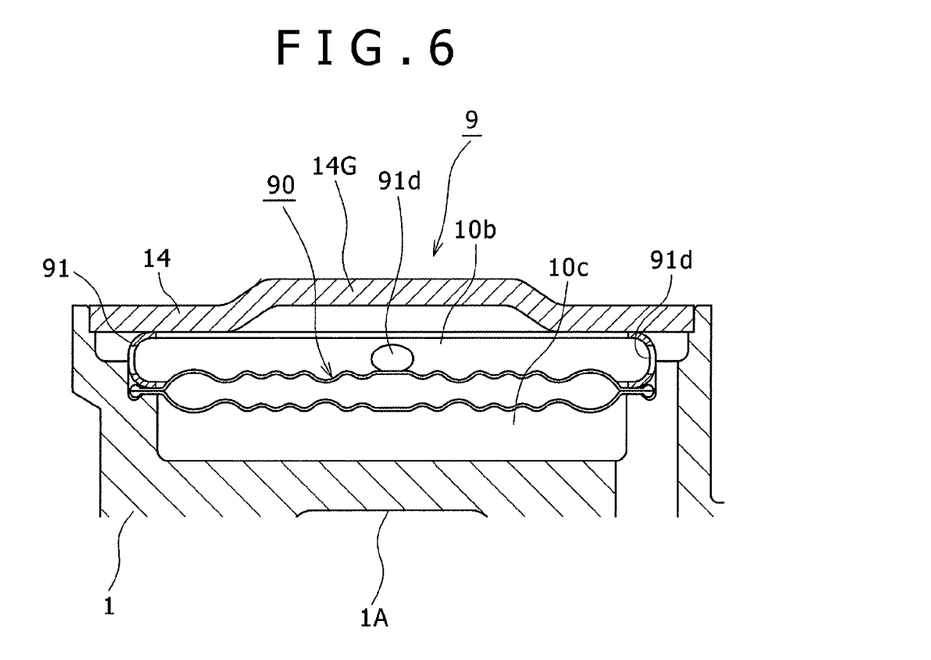
FIG. 6 is an overall vertical sectional view of a high-pressure fuel supply pump in accordance with a third embodiment practicing the present invention.

FIG. 6 is an overall vertical sectional view of a high-pressure fuel supply pump in accordance with a third embodiment practicing the present invention. The damper cover may also be formed in a shape-different from the totally flat plate shape; the damper cover may have an annular rib-shaped part 14G for increasing the stiffness or for other functional purposes. One rib or multiple ribs may be formed in the concentric manner. The ribs may also be formed in wavy shapes. Ribs in the radial directions or radiation directions may also be employed.

Figure 7:
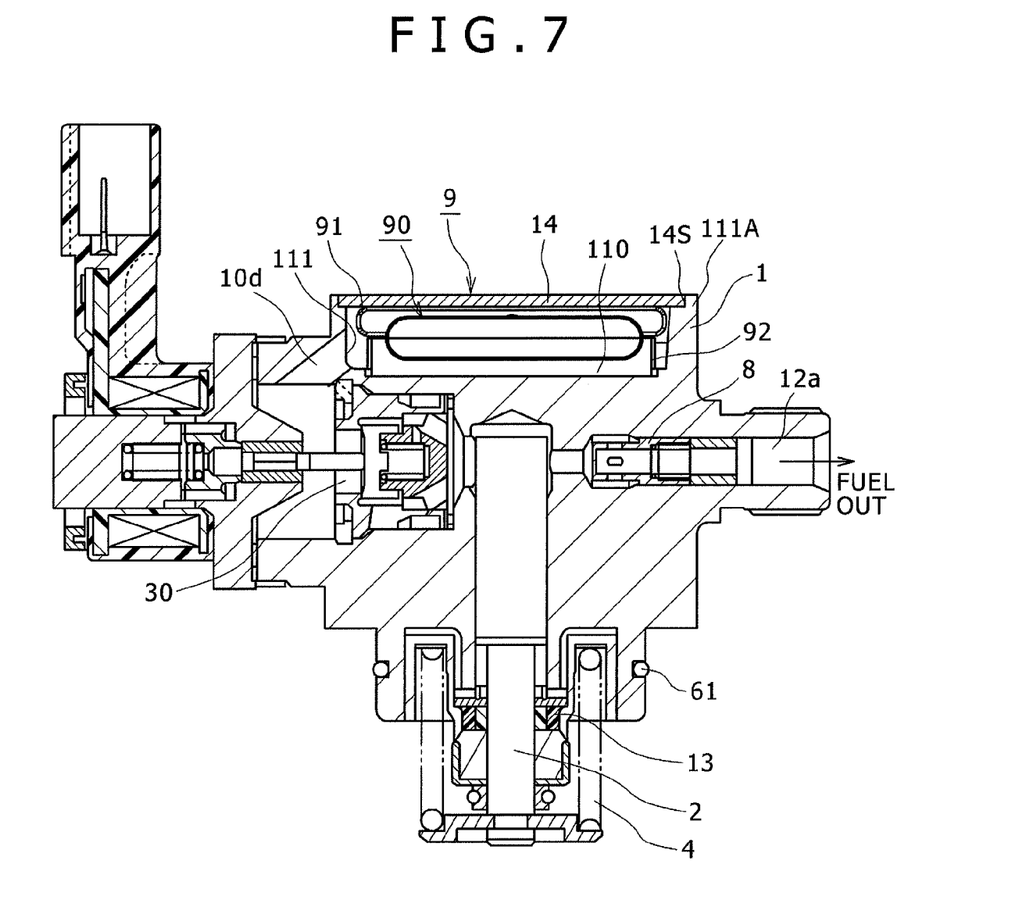
FIG. 7 is an overall vertical sectional view of a high-pressure fuel supply pump in accordance with a fourth embodiment practicing the present invention.

FIG. 7 is an overall vertical sectional view of a high-pressure fuel supply pump in accordance with a fourth embodiment practicing the present invention.

In the pump body (pump housing 1), the bottomed (110) tubular concave part 111 is formed in a part of the intake path 10c. The bottomed (110) tubular concave part 111 serves also as the storage room for the metallic damper 90. At the open end 111A of the bottomed (110) tubular concave part 111, the outer circumferential surface 14S of the tabular damper cover 14 is engaged with the inner circumferential surface of the bottomed (110) tubular concave part 111. The low-pressure pulsation reducing mechanism 9 (damper mechanism) for reducing the pressure pulsation on the low pressure side (occurring in the pump) is installed in the bottomed (110) tubular concave part 111 isolated by the tabular damper cover 14. The storage room for the metallic damper 90 is formed between the bottomed (110) tubular concave part 111 concavely formed on the top outer wall of the pump housing 1 and the tabular damper cover 14 closing the open end 111A of the bottomed (110) tubular concave part 111.

The metallic damper 90 is provided with a table 92 (as the mount for the metallic damper 90) arranged in the storage room for the metallic damper 90. The brim part formed on the outer circumference of the metallic damper 90 is set on the table. The doughnut-shaped damper holder 91 is set on the upper surface of the brim part. Then, the damper cover 14 is put on the doughnut-shaped damper holder 91 and pressed down toward the bottom of the storage room in the same way as the above embodiments. Consequently, the outer circumferential surface 14S of the damper cover 14 is engaged with (fit in) the inner circumferential surface of the open end 111A of the bottomed (110) tubular concave part 111.

As above, the present invention is implementable even in cases where the configuration of the other parts of the pump or the configuration of the damper is different.

Figure 8:
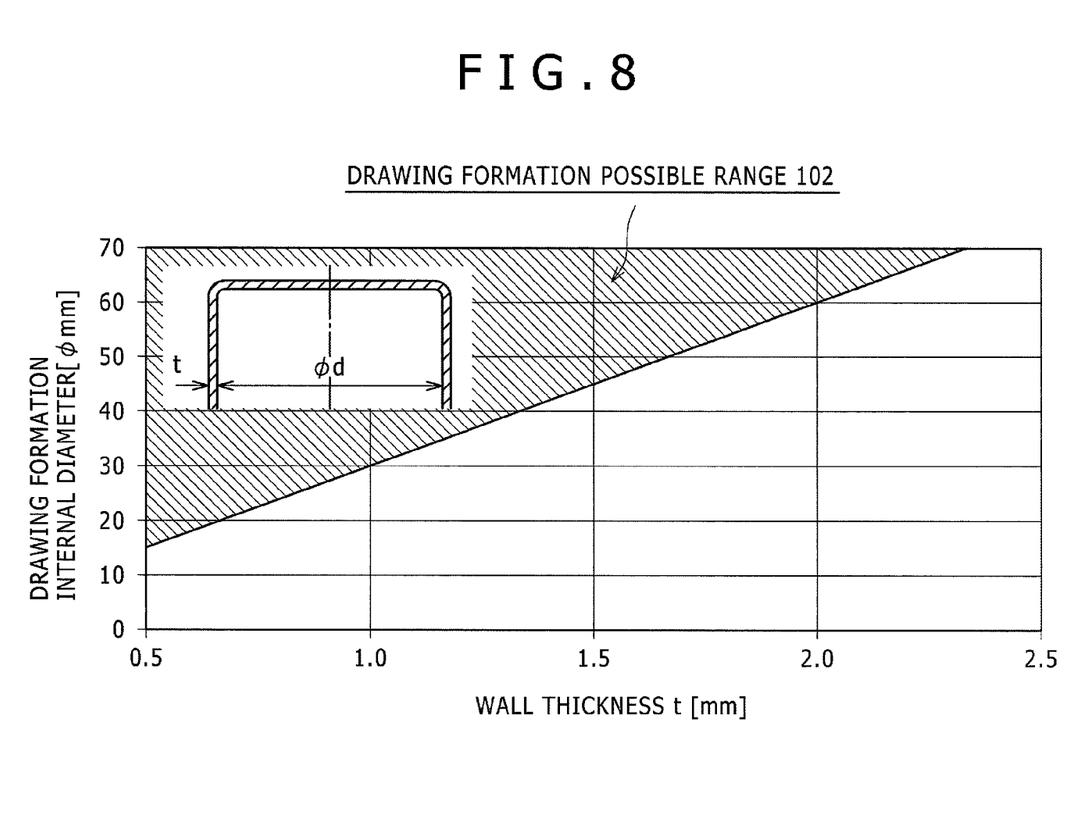
FIG. 8 is a schematic diagram explaining the relationship between the wall thickness of the cover and the limit of the drawing process.

FIG. 8 is a schematic diagram explaining the relationship between the material plate thickness of the damper cover and the limit of the drawing process. FIG. 8 shows an example of the relationship between the wall thickness of the plate material and the limit of the internal diameter of a cup-shaped damper cover that can be formed by the drawing process without much difficulty in a case where an ordinary steel material is used. Since the upper limit of the employable plate thickness is directly determined by the internal diameter required to be formed by the drawing process, the cup-shaped damper cover is low in the degree of freedom of design in terms of strength and stiffness. For example, when a plate thickness of 2 mm is necessary, the drawing internal diameter is required to be φ60 mm or more according to FIG. 8. In contrast, in the present invention in which the damper cover is formed in a flat plate shape and the drawing process is unnecessary, the plate thickness can be designed freely.

Further, in the case where no drawing process is carried out, there is no residual stress caused by the processing. Thus, the present invention has another advantage in that it is possible to leave out the annealing process which has been necessary for securing dimensional stability and preventing stress corrosion cracking caused by salt damage.

As above, with the flat plate shape of the damper cover in the present invention, two processes (drawing process and annealing process) can be left out. Consequently, the productivity can be increased.

Figure 9:
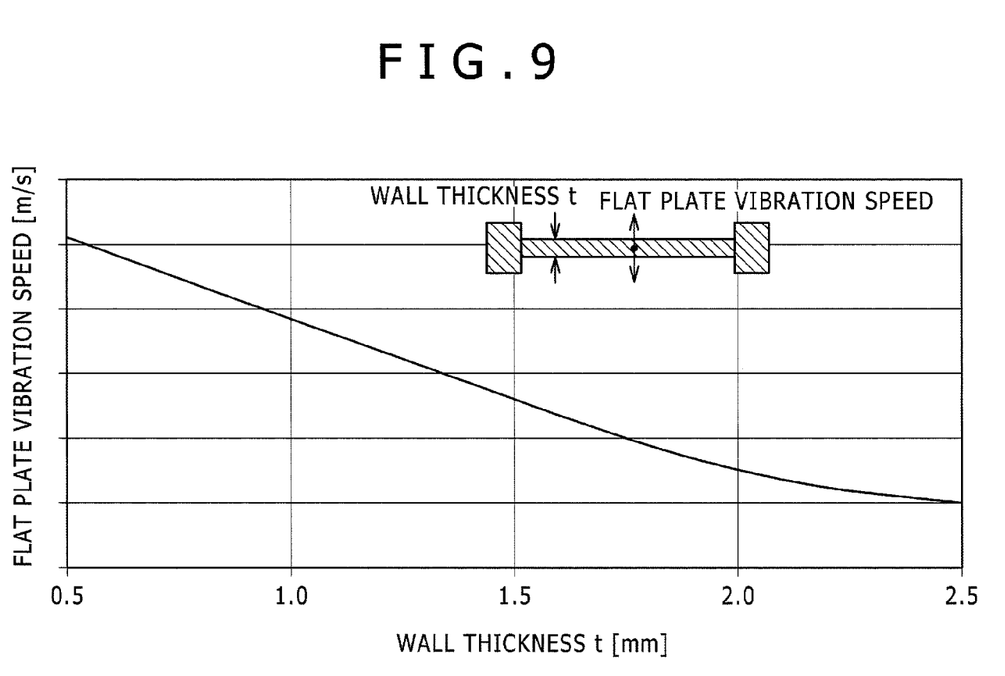
FIG. 9 is a schematic diagram explaining the relationship between the wall thickness and the stiffness of the cover.

FIG. 9 is a schematic diagram explaining the relationship between the wall thickness and the stiffness of the damper cover. FIG. 9 shows the dependence of the vibration speed of a flat plate on the wall thickness in a case where vibration energy transmitted from other parts of the pump is constant. The flat plate vibration speed decreases with the increase in the wall thickness. Since the sound pressure emitted from the damper cover (flat plate) is proportional to the vibration speed, the volume of sound emitted to the outside decreases as the result of increasing the wall thickness. Thus, it is desirable to set the wall thickness of the damper cover as great as possible.

While the damper mechanisms explained above are formed inside the pump housing of the high-pressure fuel supply pump, it is also possible to provide a damper housing in a low-pressure fuel path part separately from the high-pressure fuel pump and form a similar low-pressure pulsation reducing mechanism (damper mechanism) in the damper housing. In this case, an embodiment of the low-pressure pulsation reducing mechanism (damper mechanism) can be configured by reading the "pump body" or "pump housing" in the explanation of the above embodiments as "damper body" or "damper housing".

By the embodiments described above, the following effects are achieved:

In the conventional cases where the cover is formed in a cup shape, increasing the wall thickness of the cover (so as to suppress the vibration of the flat plate part of the cover itself) leads to difficulty in the cover formation processing. According to the above embodiments, no drawing/bending process is necessary since the cover is in a flat plate shape. Therefore increasing the thickness of the base material does not lead to difficulty in the processing. Consequently, another effect is achieved in that the vibration of the cover itself can be suppressed by increasing the thickness of the cover.

According to the embodiments configured as above, the total height of the damper mechanism as the low-pressure pulsation reducing mechanism can be reduced and the dimensions of the damper mechanism in the radial directions can also be reduced. Consequently, a low-pressure pulsation reducing mechanism (damper mechanism) in a small size can be provided.

Further, in the case where the low-pressure pulsation reducing mechanism (damper mechanism) is formed integrally with the high-pressure fuel supply pump, the total height of the high-pressure fuel supply pump can be reduced, the dimensions of the damper part in the radial directions can also be reduced, and a high-pressure fuel supply pump in a small body size can be provided. Since the height of the high-pressure fuel supply pump measured from the position of the attachment flange can be reduced as a result, there is an advantage in that the head-shaking movement of the pump body caused by the engine vibration when the high-pressure fuel supply pump is fixed on the engine can be mitigated. Consequently, a high-pressure fuel supply pump that is resistant to vibration can be provided.

According to one of the embodiments described above, a tubular part for engaging with the outer edge of the cover is formed on the inner circumference of the open end part of the damper storage room and the laser welding is performed on the interfacial part between the tubular part and the outer edge of the cover.

As a result, the welding mark (trace of the welding) is formed on atop part of the cover. Since the laser beam can be applied from above the cover, the diameter of the laser equipment can be reduced compared to the case of the conventional cup-shaped cover for which the welding is performed by applying the laser beam to the lateral circumferential surface of the cover. Thus, there is an advantage in that an installation space for the welding equipment can be downsized.

A step part is formed in the tubular part. At the corner part of the step part, an annular gap for capturing the spatters occurring in the laser welding is formed between the upper surface of the step part and the base of the cover. Therefore, the probability of the spatters (materials of the cover and the housing melted during the laser welding) scattering in the damper storage room can be reduced. Thanks to the reduction of the spatters scattering in the damper storage room, the amount of foreign substances entering the fuel path decreases. This makes it possible to reduce accidents such as failure of a flow control valve, clogging of a fluid, path, and damage to a sliding part of the pump.

The fixation of the cover is carried out by performing the laser welding or the like between the outer edge of the cover and the inner circumferential surface of the damper storage room (facing the outer edge) in a state in which an elastic body sandwiched between the cover and the damper has been compressed by a depressing device. The method of the fixation of the cover is not restricted to the laser welding. For example, the fixation of the cover can also be carried out by forming at least one annular groove on the inner circumferential surface of the tubular part of the housing facing the outer circumferential surface of the cover, pressurizing a top outer edge part of the cover by using a pressurization tool, filling up the annular groove by causing the plastic flow to the cover member, and fixing the cover and sealing up the damper storage room by use of tensile force of the so-called "plastic joining".

It is also possible to join the cover and the housing together while sealing up the damper storage room with the joining part, by performing the friction stir welding along the annular engagement part between the cover and the housing by pressing a rotary tool against the engagement part to straddle an outer circumferential top edge part of the cover situated inside and an inner circumferential top edge part of the housing situated outside.

In either method, a metallic diaphragm damper formed by joining two metallic diaphragms together is stored in the damper storage room which is formed as the bottomed tubular concave part in the housing, the elastic body is arranged between the cover and the damper, and the damper is sandwiched between the cover and the housing. The outer edge of the cover is engaged with (fit in) the inner circumference of the open end part of the damper storage room formed as the bottomed tubular concave part in the housing. The bottomed tubular concave part is provided with a step part. In a state in which the cover has been pressed down toward the step part by a tool, the entire circumference of the cover is fixed at the engagement part.

In the case where the laser welding is carried out, the laser welding part of the cover peripheral wall is formed outside the outer circumferential welding part of the damper. With such a configuration, the welding heat between the cover and the housing does not exert any thermal influence upon the outer circumferential welding part of the damper.

While the present invention has been described above by taking a high-pressure fuel supply pump of a gasoline engine as an example, the present invention is employable also for high-pressure fuel supply pumps of diesel internal combustion engines.

The present invention is implementable for high-pressure fuel supply pumps equipped with any type of flow rate control mechanism, independently of the type and the installation position of the flow rate control mechanism.

The present invention is implementable independently of the type and the installation position of the low pressure pulsation reducing mechanism.

In the present invention, the low-pressure pulsation reducing mechanism (damper mechanism) does not necessarily have to be formed integrally with the high-pressure fuel supply pump. The basic effect of the present invention, the downsizing of the low-pressure pulsation reducing mechanism (damper mechanism), can be achieved in the same way even in cases where the low-pressure pulsation reducing mechanism (damper mechanism) is fixed to the low-pressure fuel path separately from the high-pressure fuel supply pump.

The invention claimed is:
1. A fuel supply pump comprising:
a pressurizing chamber of a pump housing;
a damper storage room formed in a fluidly upstream side of the pressurizing chamber;
a damper stored in the damper storage room;

a cover configured to close an opening end of the damper storage room with an elastic body sandwiched between the cover and the damper; and a face welding part formed between an outer circumferential part of the cover and an inner circumferential part of the damper storage room, wherein the face welding part when welded forms a flush surface with the cover and the damper storage room in a direction parallel to a reciprocating direction.

2. The fuel supply pump according to claim 1,
wherein the pump housing includes an intake joint along a top portion of the pump housing;
wherein the damper storage room is formed in a bottomed tubular shape, wherein the tubular shape extends along a first axis perpendicular to the reciprocating direction of a position;
wherein the damper is fixed to the pump housing by a damper holder and the damper includes a top portion offset from a bottom portion along a second axis that is parallel to the reciprocating direction of a position axis; and wherein
the fuel supply pump further comprises:
a first fuel path that extends along the second axis that is perpendicular to the first axis and connects the intake joint to an intake fuel path, wherein the intake path extends around the damper holder so that low-pressure fuel evenly acts on both the top portion of the damper and the bottom portion of the damper.

3. The fuel supply pump according to claim 2, wherein the cover is at least partially stored in the tubular part of the damper storage room.

4. The fuel supply pump according to claim 1, wherein outer circumferences of two diaphragms are welded together in an inner region of the face welding part to form the damper.

5. The fuel supply pump according to claim 1, wherein the damper is arranged closer to a bottom part of the damper storage room than the face welding part is.

6. The fuel supply pump according to claim 1, wherein the damper further comprises a brim part at an outer circumference of the damper and the elastic body butts the brim part directly.

7. The fuel supply pump according to claim 1, wherein the elastic body has a U-shaped cross section extending in a circumferential direction.

8. The fuel supply pump according to claim 1, wherein the elastic body has a plurality of through holes communicating between an inner space and an outer space of the elastic body.

9. A damper mechanism comprising:
a pressurizing chamber;
a damper storage room formed in a fluidly upstream side of the pressurizing chamber;
a damper stored in the damper storage room;
a cover arranged in an opening end of the damper storage room with an elastic body sandwiched between the cover and the damper; and
an annular welding portion exposed in a direction parallel to a reciprocating direction, wherein the annular welding portion joins an outer circumferential part of the cover and an inner circumferential part of the damper storage room and the annular welding portion when welded forms a flush surface with the cover and the damper storage room.

10. The damper mechanism according to claim 9,
wherein the damper storage room is formed in a bottomed tubular shape, wherein the tubular shape extends along a first axis perpendicular to the reciprocating direction of the piston;
wherein the damper is fixed to a housing of the damper storage room by a damper holder and the damper includes a top portion offset from a bottom portion along a second axis that is parallel to the reciprocating direction of the piston; and
wherein the damper mechanism further comprises:
a first fuel path that connects an intake joint to an intake fuel path, wherein the first fuel path extends along the second axis that is perpendicular to the first axis, wherein the intake path extends around the damper holder so that low-pressure fuel evenly acts on both the top portion of the damper and the bottom portion of the damper.

11. The damper mechanism according to claim 10, wherein the cover is at least partially stored in the tubular part of the damper storage room.

12. The damper mechanism according to claim 9, wherein outer circumferences of two diaphragms are welded together in an inner region of the annular welding portion to form the damper.

13. The damper mechanism according to claim 9, wherein the damper is arranged closer to a bottom part of the damper storage room than the annular welding portion is.

14. The damper mechanism according to claim 9, wherein the damper further comprises a brim part at an outer circumference of the damper and the elastic body butts the brim part directly.

15. The damper mechanism according to claim 9, wherein the elastic body has a U-shaped cross section extending in a circumferential direction.

16. The damper mechanism according to claim 9, wherein the elastic body has a plurality of through holes communicating between an inner space and an outer space of the elastic body.

17. A method for manufacturing a fuel supply pump comprising:
forming a damper storage room in a bottomed tubular shape, wherein the tubular shape extends along a reciprocating direction of a piston, in a pump housing which has a pressurizing chamber;
fixing a damper in the damper storage room by a damper holder;
providing an elastic body mechanically coupled to the damper;
mechanically coupling a cover to the elastic body to close an opening end of a tubular part of the damper storage room with the elastic body sandwiched between the cover and the damper;
forming an annular welding portion that is exposed in a direction parallel to the reciprocating direction between an inner circumference of the tubular part of the damper storage room; and
welding the annular welding portion to form a flush surface with the cover and the damper storage room, wherein the welding is performed by applying a laser beam to an interfacial part between the cover and the inner circumference of the tubular part of the damper storage room from above the cover along the reciprocating direction.

* * * * *